No. 784,377. PATENTED MAR. 7, 1905.
G. W. BEEBE.
CHECK PROTECTOR.
APPLICATION FILED FEB. 8, 1901.

WITNESSES
E. G. Strause
Richard Paul

INVENTOR
GAYLORD W. BEEBE
BY Paul Hawley
HIS ATTORNEYS

No. 784,377. PATENTED MAR. 7, 1905.
G. W. BEEBE.
CHECK PROTECTOR.
APPLICATION FILED FEB. 8, 1901.

WITNESSES

INVENTOR
GAYLORD W. BEEBE
BY Paul Hawley
HIS ATTORNEYS

No. 784,377. PATENTED MAR. 7, 1905.
G. W. BEEBE.
CHECK PROTECTOR.
APPLICATION FILED FEB. 8, 1901.

Witnesses
E. G. Staude
Richard Paul

Inventor
GAYLORD W. BEEBE
By Paul A. Hawley
HIS ATTORNEYS

No. 784,377. PATENTED MAR. 7, 1905.
G. W. BEEBE.
CHECK PROTECTOR.
APPLICATION FILED FEB. 8, 1901.

WITNESSES

INVENTOR
GAYLORD W. BEEBE
BY
HIS ATTORNEYS

No. 784,377. PATENTED MAR. 7, 1905.
G. W. BEEBE.
CHECK PROTECTOR.
APPLICATION FILED FEB. 8, 1901.

WITNESSES
E. G. Staude
Richard Paul

INVENTOR
GAYLORD W. BEEBE
BY Paul & Hawley
HIS ATTORNEYS

Patented March 7, 1905.

UNITED STATES PATENT OFFICE.

GAYLORD W. BEEBE, OF MINNEAPOLIS, MINNESOTA, ASSIGNOR TO G. W. TODD & COMPANY, OF ROCHESTER, NEW YORK, A FIRM.

CHECK-PROTECTOR.

SPECIFICATION forming part of Letters Patent No. 784,377, dated March 7, 1905.

Application filed February 8, 1901. Serial No. 46,498.

*To all whom it may concern:*

Be it known that I, GAYLORD W. BEEBE, of Minneapolis, Hennepin county, Minnesota, have invented certain new and useful Improvements in Check-Protectors, of which the following is a specification.

My invention relates to means for marking checks, drafts, bonds, or other instruments with figures or characters in such a manner as to prevent them from being altered or "raised."

The primary object of the invention is to provide means for marking or perforating the paper with the words "Not over," followed by figures representing a sum greater than the face value of the check, draft, or other instrument.

A further object is to provide a check-protector that can be easily and quickly operated, requiring but one movement of a lever for a complete operation and having consequently a large capacity, and therefore particularly adapted for use in large banks and business houses.

Other objects of the invention will appear from the following detailed description.

The invention consists generally in providing an improved wheel, drum, or die-holder, rotating in a vertical plane and carrying a series of improved dies.

Further, the invention consists in improved means for moving said dies into engagement with the paper to be marked or perforated.

Further, the invention consists in improved means for marking or perforating the words "Not over" on the face of the check or draft.

Further, the invention consists in improved means for inking the dies prior to their engagement with the paper; further, the invention consists in improved means for inking the dies after the perforation of the paper.

Further, the invention consists in providing means for gripping the paper and drawing it taut during the perforating operation.

Further, the invention consists in various constructions and combinations, all as hereinafter described, and particularly pointed out in the claims.

In the accompanying drawings, forming part of this specification.

In the drawings, 2 represents a base that is preferably rectangular in form and may be made of cast or sheet metal or of wood, if preferred. At the rear of the base I provide an upright standard having legs 3 suitably secured to the base and a central horizontal hub 4, above which is an arm 5, extending to the top of the machine and terminating in a forwardly-projecting extension 6. The base is provided with a top 7, integral therewith or not, as preferred, and a disk 8, mounted on the base, forms the rear wall of the machine opposite a disk 9 on the front, and between said disks I provide an incomplete ring or band 10, which, with said disks, incloses and forms a protecting case or cover for the upper portion of the machine.

Figure 1:
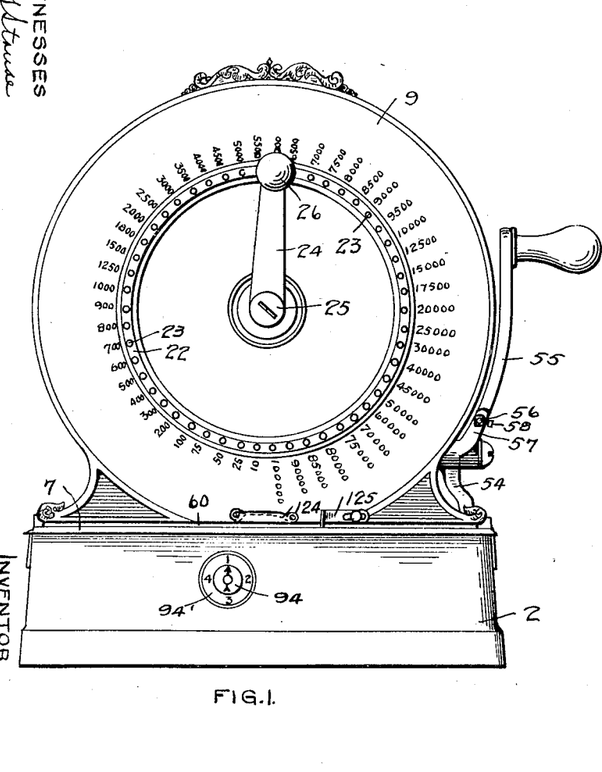
Figure 1 is a front view of a check-protector embodying my invention.

A shaft 11 is mounted in a long bearing 12 in the hub 4 and is secured therein by a suitable washer and a pin 13, which prevents forward movement of the shaft in its bearing. The front end of said shaft projects through the disk 9 and is provided with a squared end 14, and an enlarged portion 15, having a shoulder 16, adapted to bear on the end of the hub 4, prevents backward movement of the shaft, while permitting it to revolve freely in its bearing. A hub 17 is preferably mounted on the enlarged portion 15 of said shaft and is adapted to bear on the end of the hub 4 and aid in retaining the shaft in its proper position. A series of spokes 18 radiate from the hub 17 and are united at their outer ends to a drum, cylinder, or ring 19, that is arranged within the casing and constitutes the rotating die-holder, whereon the dies for making the figures are supported. The shaft 11, the hub 17 thereon, the drum 19, and the parts connected with the same are all preferably cast in one piece. Upon the face of the disk 9 I provide figures representing sums, preferably from ten dollars to one hundred thousand dollars, and within said circle or dial of figures I provide a ring 22, having a series of holes or depressions 23, there being one hole opposite each set of figures on the dial. It will be understood that the dial may be graduated to represent any desired sum, but I prefer to provide figures below those representing one hundred dollars that are multiples of twenty-five, with the exception of the first. Above the figures representing one hundred dollars up to one thousand dollars I prefer to provide figures representing the even hundreds, and from that point on to the end of the circle or limit of the dial I may provide additional figures for every two hundred and fifty dollars or five hundred dollars increase in the sum to be indicated. These sums may be varied according to the work for which a machine is designed. There are as many dies carried on the die-holder 19 as there are separate sums or amounts indicated on the dial; but the lowest sum indicated by the dies is at the top of the machine, and the sums increase from right to left, while on the dial the smallest sum is at the bottom, and the increase is from left to right. Therefore when the operating lever or arm is set, for instance, opposite the sum "$6,000," as shown in Fig. 1, the die representing that amount will be in position to be actuated to perforate the paper when the lever 55 is operated. A single movement of this lever will rock the shaft, depress the die representing the words "Not over," and actuate the die bearing the figures to be cut in the paper without the necessity of moving the check or draft during the operation.

Figure 2:
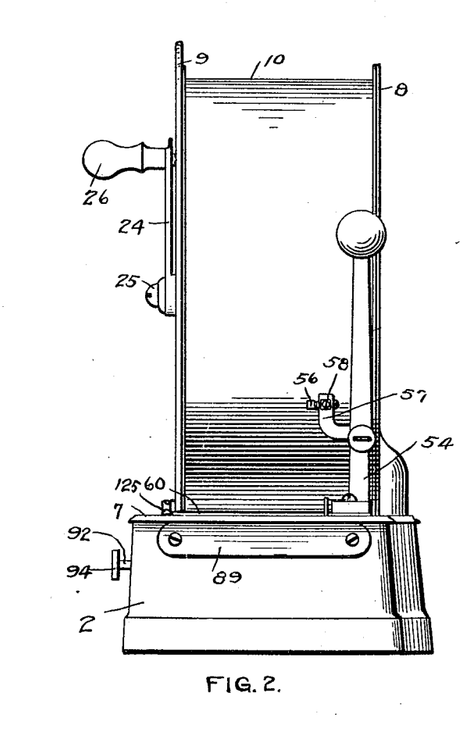
Fig. 2 is a side view of the same.
Figure 3:
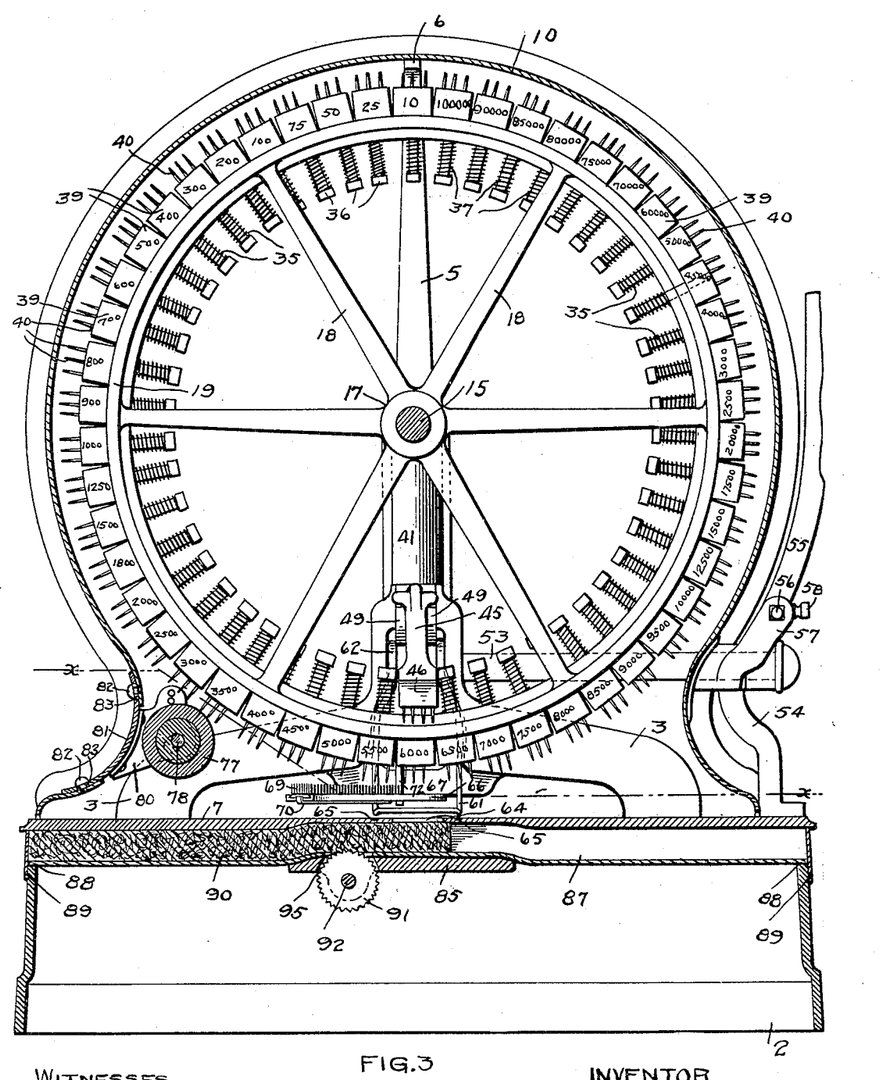
Fig. 3 is a vertical section on the line $w\,w$ of Fig. 4.

As shown in Figs. 1 and 2, an opening or slot 60 is left between the base and the casing inclosing the top of the machine to permit the insertion or withdrawal of a check in front or on either side, and, as shown in Fig. 3, the space between the legs 3 of the standard will also permit the insertion or withdrawal of a check at the rear of the machine. This construction permits the convenient and rapid insertion or withdrawal of the paper, and, in connection with the mechanism for marking or perforating and inking the check at one stroke of the lever, renders the machine particularly adapted for large banks and business houses, where a large number of checks or drafts are drawn daily, and convenience and rapidity of action are features especially to be desired in machines of this character.

To detach the paper from the points of the dies on their upstroke, I prefer to provide a loop 61, preferably of spring-wire, inclosing the portion of the paper engaged by the dies and having upwardly-turned ends 62, that extend over the top of the shaft 53 and enter holes 63 in the ends of the hub 52. The loop preferably has a turned-up outer end to prevent it from interfering with the paper when inserted into the machine and to aid in guiding the same therein. A slot 64 is provided in the top of the base beneath the loop 61 in position to receive the dies after they pass through the paper.

On the under side of the hub 4 is a depending stud 41, having a socket 42, wherein a guide-pin 43 is vertically slidable. This pin is carried by a plunger 44, having a downwardly-curved arm or extension 45, carrying a die 46, in the face of which is arranged a series of needle-points representing in outline the words "Not over." The plunger 44 has a lug 48 depending between arms 49, and a pin 50, provided on said lug, is adapted to slide freely in slots 51 in the ends of said arms. A hub 52, mounted on a rock-shaft 53, carries the arms 49 and when said shaft is rocked depresses the plunger 44, projects the die 46 through one of the openings in the wheel 19, and at the same time actuates the pins that may be beneath said plunger to project the die carried thereby into engagement with the paper. The shaft 53 is mounted in suitable bearings at its inner end in the standard at the rear of the machine and at its outer end is supported in a bearing provided on a suitable bracket 54 outside the casing of the machine.

55 is an oscillating operating-handle mounted on the outer end of the shaft 53, and an adjustable screw 56, carried by an arm 57 and locked by a set-screw 58, forms a stop for regulating the stroke of the operating-lever. The plunger 44, the die 48, and the arms 49 are normally held in an elevated position by a spring 59, preferably connected to the plunger 44 and to the hub 4. When the operating-lever is moved to oscillate its shaft and depress the arms 49, the plunger 44 will be drawn down against the tension of the spring 59. During the first part of the movement of the mechanism the die 46 will be advanced to a point opposite the end of the die for marking or perforating the figures that may happen to be opposite the die 46 at that particular time. When the die 46 has reached this position, the plunger 44, passing down between the arms 49, will strike the heads of the pins 35, move the die carried thereby into engagement with the paper, and at the same time advance the die 46 also. Both dies therefore will engage and perforate the paper simultaneously, one being carried by the plunger and the other being actuated thereby when near the limit of its downstroke.

On the squared ends of the shaft 11 I provide an arm 24, secured thereon by a screw 25 or other suitable means and having a handle 26 to receive the threaded end of a stud 27, provided in a socket 28 on the end of the handle. The stud 27 has a head 29, provided with a pin 30, that is adapted to enter any one of the holes 23 and be normally held therein by a spring 31, arranged within the socket 28. The operator by grasping the handle 26 and pulling the same may easily disengage the pin 30 from its socket and may then move the arm 24 over the face of the dial and set it opposite the figures representing any sum thereon. The rotating die-holder 19 is provided with a series of rectangular slots or opening, 32, provided at intervals in its periphery, preferably near its forward edge, and it is also provided with a double row of holes 33, arranged at intervals opposite said slots. The rear edge of said holder is provided with a series of notches 34, arranged at intervals opposite said holes for the purpose hereinafter described. Within the holes 33 I provide a series of loose pins 35, preferably having heads 36 and normally held in a retracted position by light springs 37. These pins are provided with reduced threaded ends 38, that project beyond the periphery of the holder, and on said threaded ends I arrange dies 39, bearing on their faces a series of needle-points 40, arranged to represent the outline of the figures to be marked in or on the paper. These dies are rectangular in form and normally rest upon the outer surface of the holder and are moved or projected outward when the pins are struck by the operating mechanism.

I prefer to provide shallow grooves 65 in the top of the base upon each side of the slot 64, that are adapted to receive the sides of the loop 61 when the dies are depressed. The paper to be perforated will rest upon the base-top over the slot 64, and just before the dies engage the paper it will be clamped or pressed down by the spring-loop, and the arms of the loop will force the paper into the grooves 65 and draw it taut over the slot beneath the dies, so that a uniform perforation or cutting will be made, and the under surface of the paper will be prevented from becoming smeared with ink by contact with the pad beneath. As soon as the operator releases the operating-arm the dies will return to their normal position, and the loop 61 will hold the paper firmly until the dies are withdrawn. The loop therefore has two functions, one to hold the paper securely during the perforating operation and the other to detach it from the dies when the operation has been completed.

It is desirable to provide means for automatically inking the points of the dies prior to their engagement with the paper, and I therefore provide an oscillating arm 66, pivoted on a lug 67 by means of a stud and pivot pin or screw 68. The arm 66 is provided with a dovetailed groove to receive a correspondingly-shaped back or base on the brush 69, that is held in position in said groove by a spring 70. The arm 66 is provided near its pivot with a fork 71, wherein the lower end of a lever 72 is slidable, said lever having a hook 73 passing over a rod 74, whereby said lever is supported. The upper end of said lever engages a notched or recessed lug 75 on the hub 52, so that oscillation or rocking of said hub will cause a corresponding movement of the lever, which in turn will move the arm 66 across the die-points just prior to their engagement with the paper. The points of the dies are thus automatically inked and on passing through the paper will force the ink into the fibers of the same and render it impossible to alter or "raise" the sum indicated by the perforations therein. I also prefer to provide a lug or projection 76 on the lever 72, that is adapted to enter one of the notches 34 and act as a guide during the perforating operation. If for any reason the dies should not be in their proper position to perforate the paper, then the lug cannot enter one of the notches and will act as a stop to prevent the operation of the machine until the dies are adjusted. I prefer also to provide other means for inking the figure-bearing dies. This means consists, preferably, in an inking-roll 77, having its axis 78 supported within slots 79 in brackets 80 on a curved plate 81. This plate is adjustably secured over an opening in the wall of the casing by means of set-screws 82, fitting within slots 83 in said plate. The operator is thus able to adjust the inking-roll in proper position to engage the points of the figure-bearing dies when the die-holder is revolved. I prefer to provide springs 84 on the brackets 80, that are adapted to engage the axis 78 and hold the roller yieldingly toward the dies. This construction renders accurate adjustment of the plate 81 unnecessary. The points of the dies are thus thoroughly inked before their engagement with the paper and a quantity of ink will be forced into the fiber of the paper upon each descent of the dies. It is also desirable to provide means for inking the dies after they have passed through the paper, so that on their return the fiber will be thoroughly inked on the under side to render still more difficult any change or alteration in the perforation or cuttings. With this end in view I provide a shallow trough 85, supported by lugs 86, on the under side of the top 7 beneath the slot 64 therein. Resting upon the trough 85 is a pad-receptacle 87, conforming to the shape of the trough and having its ends supported within openings 88 in the side walls of the base. These openings are normally covered by removable plates 89 and permit the insertion and removal of the pad. The receptacle 87 is preferably of tin, having a smooth inner surface over which the flat inking-pad 90 easily slides. As before stated, the trough 85 is beneath the die-opening in the base and has a flat surface to receive the bottom of the pad-receptacle. The bottom of the receptacle beneath the die-opening 64 is, owing to the position of the trough 85, raised slightly above its end portions, so that the pad will fit snugly between the edges of the die-opening and the bottom of the pad-receptacle and be held firmly during the perforating operation, and the trough 85, besides forming a firm substantial support for the pad, also presents a flat uniform surface or backing for the pad-receptacle and insures a uniform perforation of the paper. I prefer to make the pad adjustable in its receptacle, and I therefore provide a series of toothed wheels 91, mounted on a spindle 92, that is supported in ears 93, depending from the trough 85, and said spindle, extending through the wall of the base, is rotated by means of a finger-grip 94. To indicate to the operator the position of the pad with respect to the die-opening, I provide a series of graduations or marks 94' on the base and a suitable indicator-hand 92' on the spindle. These graduations are spaced so that movement of the hand from one to the other will present a fresh inking-surface to the dies. The wheels 91 are adapted to extend through slots 95 in the trough 85 and the pad-receptacle, so that their teeth will engage the under surface of the pad and move the same in either direction, according to the direction of rotation of the spindle. On each depression of a die the points after passing through the paper will enter the ink-pad and receive a quantity of ink to deposit in the fiber of the paper on their upstroke, and the pad being adjustable permits me to present a fresh inking-surface to the action of the dies whenever desired.

Figure 5:
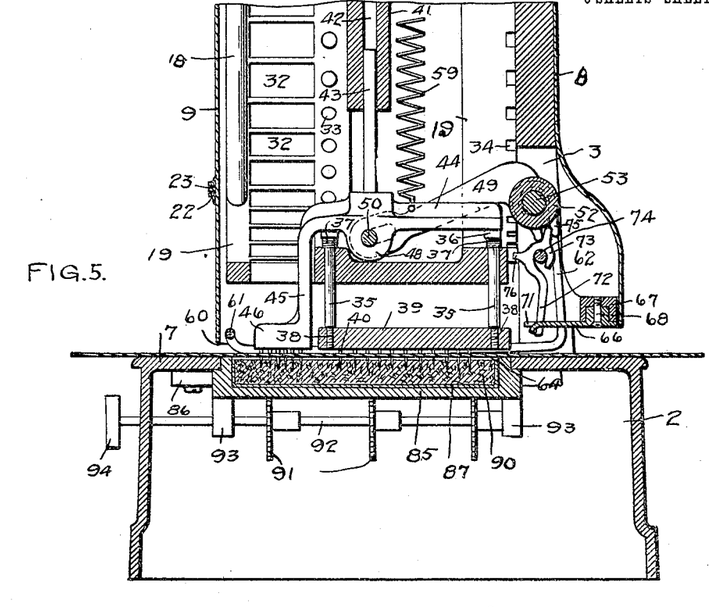
Fig. 5 is a similar view of the lower portion of the machine, showing the position of the dies at the completion of their downward stroke.
Figure 6:
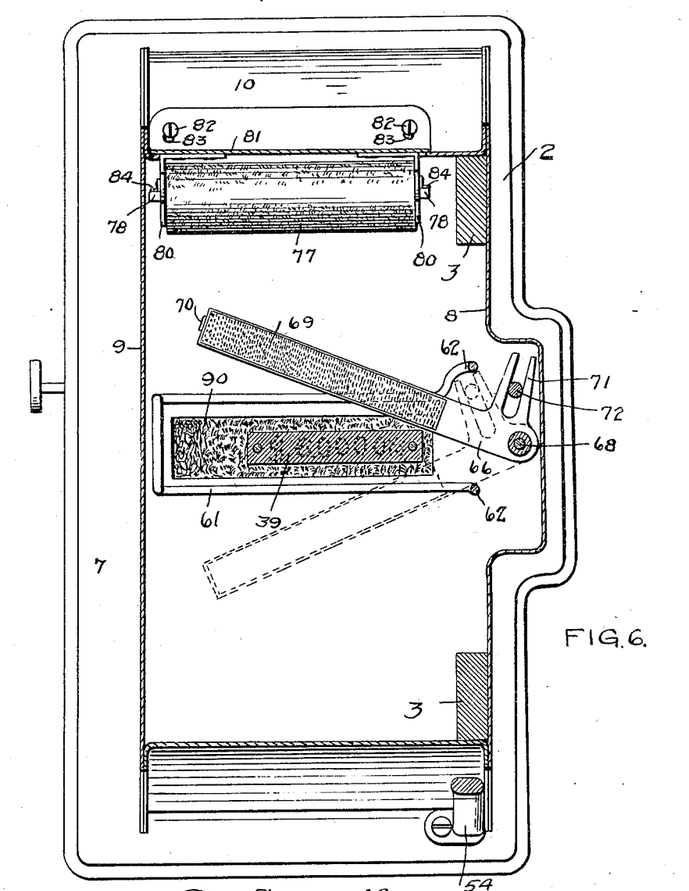
Fig. 6 is a horizontal section substantially on the line $x\,x$ of Fig. 3, showing the upper side of one of the dies after passing the inking-brush.
Figure 7:
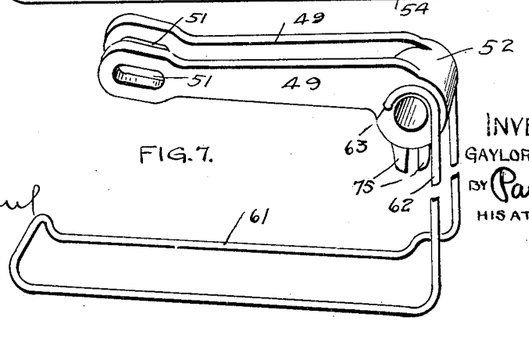
Fig. 7 is a perspective of a portion of the operating mechanism and the spring-arm for disengaging the paper from the dies.

As shown is Fig. 5, the top of the pad is below the surface whereon the paper to be perforated is laid, and as the spring-arm heretofore described holds the paper firmly upon each side of the die-opening its under side cannot come in contact with the pads and be smeared with ink.

In Figs. 9 to 12, inclusive, I have shown a modified construction of dies, which consists in dispensing with the needle-point dies heretofore described and providing a male die 96 for the words "Not over" and providing a series of male dies 97 on the periphery of the holder. Within the base I provide endless ribbons or belts 98 and 98', preferably of steel, carrying a series of female dies 99, adapted to coincide, respectively, with the dies 96 and 97. The dies 99 are loosely secured on the ribbons by rivets 100, which permit the ribbons to move easily over bobbins or rolls 101, supported on shafts 102, mounted in bearings on each side of the base. At a point preferably midway between the rolls 101 I provide a shaft 104, supported in depending lugs 105 and having hubs 106 and 107 secured thereon. These hubs have bearing-surfaces to support the upper sections or runs of the ribbons and also form a firm support for a female die when it is in position to be engaged by the male die. The hub 107 is provided with a series of teeth 108, adapted to enter correspondingly-shaped holes 109 in the ribbons 98 and feed the ribbons and female dies past the die-opening in the base.

Figure 9:
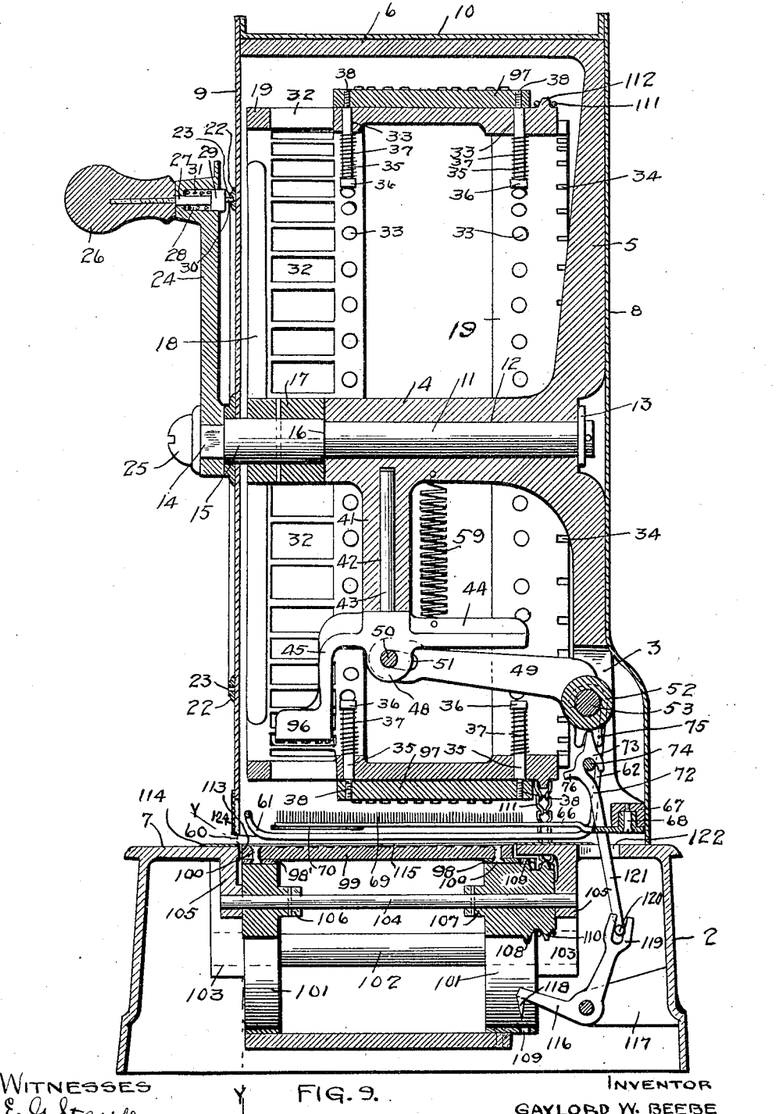
Fig. 9 is a vertical section showing a modified construction.

Any suitable means may be provided for operating the shaft 104; but I prefer to provide a sprocket 110 on the hub 107 and connect the same by a chain 111 with a sprocket 112, provided on the ring 20. Rotation of the ring 20 and the male dies will therefore move the female dies a corresponding distance.

When the male and female die construction is used, I prefer to provide a large opening 113 in the top of the base, and in order that the paper during the perforating operation may not be smeared with ink by contact with a female die that is not in use I may provide a thin metal strip or ribbon 114, having a slot 115 corresponding in shape to the female die beneath. This ribbon or plate covers all the female dies except the one that is in use when the machine is operated, and when the paper is inserted between the dies the arms of the loop 61 will hold it down under the ribbon or plate and prevent its under surface from coming in contact with the die, but at the same time permitting contact of the dies through the slot 115 and the consequent indenting and inking of the paper.

Figures 4, 8:
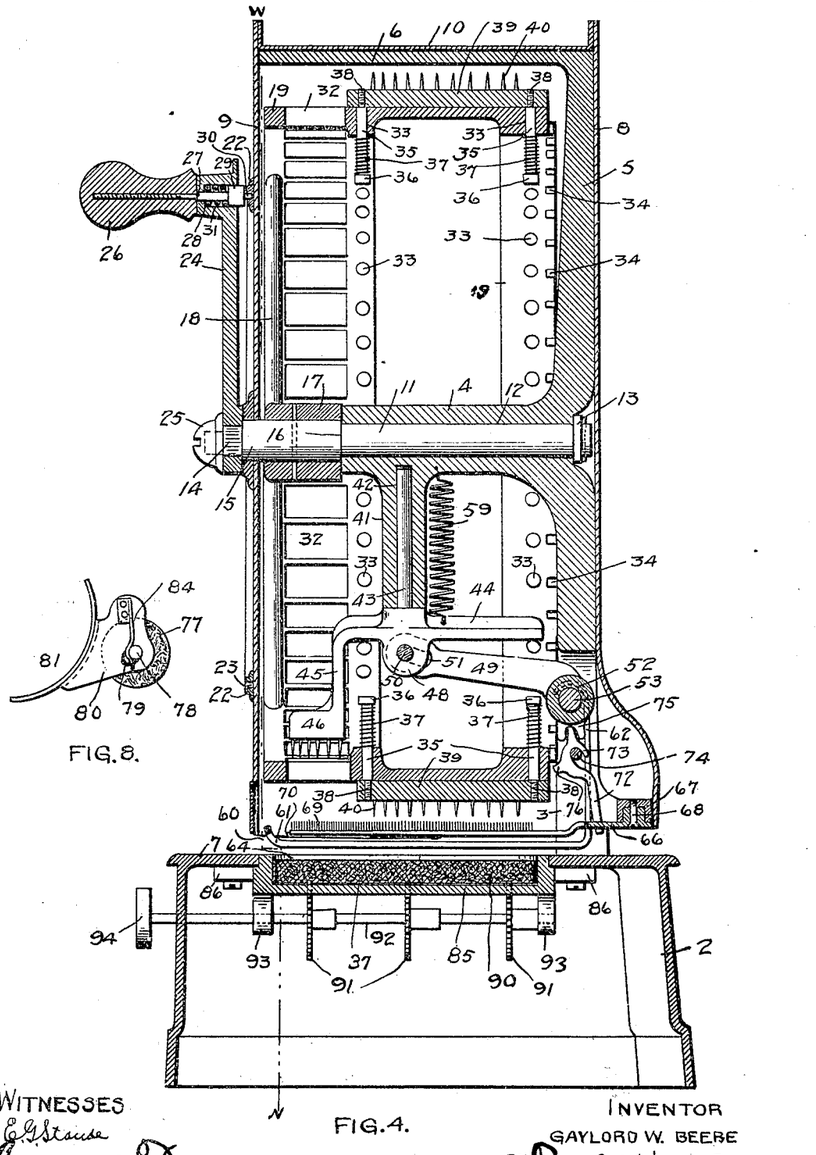
Fig. 4 is a vertical section.
Fig. 8 is a detail of one of the inking devices.

It may sometimes happen that the female die will not, owing to slippage of the ribbon, be in its proper position to receive the male die, and I therefore prefer to provide means for automatically adjusting the ribbons and female dies with each operation of the machine. This means consists in a bell-crank 116, pivotally supported between lugs 117 and provided on one arm with a tapered pin 118, that is adapted to enter any one of the holes 109 in the ribbon. The pointed end of the pin 118 will readily enter one of the holes, and as the pin is pushed into the hole by the movement of the bell-crank the ribbon and dies will be moved either one way or the other, according to their position with respect to the male dies. The other arm of the bell-crank is provided with a fork 119 to receive a pin 120, provided on an extension 121 of the lever 72, said extension projecting down through a slot 122 in the base. This lever corresponds substantially to the lever heretofore described with reference to Fig. 4, and the operation of the male dies is substantially the same as that of the needle-point dies shown in said figure.

Figures 10, 11, 12:
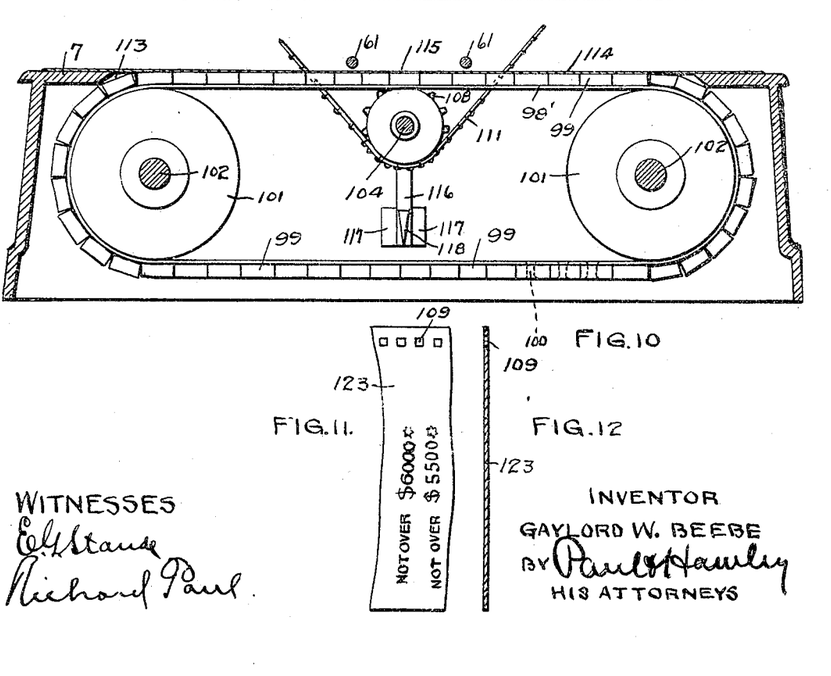
Fig. 10 is a section on the line $y\,y$ of Fig. 9.
Figs. 11 and 12 are details of a female die, ribbon, or band.

As shown in Figs. 11 and 12, I may employ a single female-die ribbon 123 in place of the dies and the die-bearing ribbons heretofore described, in which case the words and figures represented by the female dies will be punched or perforated in the ribbon, as shown in Fig. 11, and the descending male dies will engage these perforations and indent, crush, or cut the paper in the manner heretofore described with reference to Fig. 9. The ribbon 123 is provided near one end with a series of holes corresponding to the holes in the ribbon 98, and movement of the ribbon 123 is effected in a similar manner to the movement of said ribbon 98.

I prefer to provide an opening in the front of the casing covered by a suitable plate 124, through which access may be had to the inking-brush, and I also prefer to provide adjustable guides 125 upon the base, by means of which the clerk or operator can regulate the distance that a check or draft can be inserted into the machine.

The operation of the machine, briefly, is as follows: The clerk having drawn a check, draft, note, or other instrument for a sum, for instance, less than six thousand dollars and over five thousand five hundred dollars will set the indicating-arm 24 opposite the numerals representing "$6,000" on the dial. When this has been done, the die bearing the needle-points representing "6,000" will then be in position over the die-opening ready to make the perforation in the paper, and the clerk having inserted the paper into the machine will grasp the operating-lever 55 and with one stroke depress the plunger, actuate the die bearing the words "Not over" and also the die bearing the figures representing "6,000" and move them into engagement with and through the paper into the inking-pad beneath. Prior to the engagement of the dies with the paper the inking-brush will have automatically swept across their points and left a quantity of ink thereon, which will be forced into the fiber of the paper by the descending points. As soon as the clerk releases the operating-lever the plunger will return to its normal position and the dies will be elevated and on their return stroke will subject the paper to a further inking process. Thus with one movement of a lever the paper is indelibly marked against any possibility of erasure or alteration. The operation of the mechanism shown in Fig. 9 is substantially the same, except that the dies instead of making perforations will indent, crush, or cut the fiber of the paper and saturating the same with ink will effectually prevent any alteration or "raising" of the check or draft.

I prefer to employ a die-holder in the form of a ring, drum, or cylinder on account of the large number of dies that may be arranged on its periphery. In a machine of this style where a sum is marked on a check or draft in excess of its face value it is necessary to provide a greater number of dies than would be employed in a machine used for perforating or otherwise marking the exact sum for which the paper is drawn.

In various ways the details of construction may be modified by any one skilled in the art without departing from my invention.

Having thus described my invention, I claim as new and desire to secure by Letters Patent—

1. A die-holder provided with a series of dies, means for causing contact between the paper and a die, and means actuated by said contacting means for automatically inking a die without moving said holder.

2. A die-holder provided with a series of dies, means for causing contact between the paper to be marked and a die, means actuating by said contacting means for automatically inking a die without moving said holder after the die has been adjusted opposite the paper to be marked.

3. The combination, with a frame, of a rotating die-holder mounted therein, a series of dies carried by said holder, and movable independently thereof, and means actuated by the force that moves a die toward the paper for inking a die after its adjustment opposite the paper to be marked and during its movement toward the same.

4. The combination, with a suitable frame, of a rotating die-holder mounted therein, a series of dies carried by said holder and movable independently of the same, means for moving said dies into engagement with the paper, and means actuated by said moving means for automatically inking a die after its adjustment opposite the paper to be marked and during its movement toward the same and while the holder is stationary.

5. The combination, with a suitable frame and casing, of a die-holder rotating in a vertical plane therein, means for rotating said holder, a series of dies carried by said holder and movable independently of the same, means for moving said dies into contact with and through the paper to be perforated or marked, and means actuated by said moving means for automatically inking a die after its adjustment opposite the paper and during its movement toward the same.

6. The combination, with a suitable frame and casing, a die-holder mounted therein, means for rotating said die-holder, a series of dies carried thereby and movable independently of said holder, means for forcing said dies into engagement with the paper to be marked or perforated, means for gripping the paper during the perforating operation, and means actuated by said forcing means for inking a die after its adjustment opposite the paper to be marked and prior to its engagement therewith and while said holder is stationary, substantially as described.

7. The combination, with a suitable frame and casing, of a die-holder rotating in a vertical plane therein, means for rotating said holder, a series of dies carried thereby and movable independently of the same, means for actuating said dies to mark or perforate the paper, means operated by said actuating means for automatically inking a die after its adjustment opposite the paper to be marked and before its engagement therewith, and means for holding or gripping the paper with a yielding pressure during the perforating operation.

8. The combination, with a suitable frame, of a rotating die-holder mounted therein, means for operating said holder, a series of dies carried thereby and movable independently thereof, each die representing a certain sum to be marked or perforated in the paper, a die representing the words "Not over," and means for operating one of said first-named dies and said last-named die simultaneously to move the same into engagement with the paper, substantially as described.

9. The combination, with a suitable frame, of a die-holder rotating in a vertical plane therein, means for operating said holder, a series of dies carried thereby and movable independently thereof, each die representing a certain fixed sum to be marked or perforated in the paper, a die representing the words "Not over," means for actuating any one of said first-named dies and said last-named die simultaneously, and means for inking said dies.

10. The combination, with a suitable frame, of a die-holder rotating in a vertical plane therein, means for operating said die-holder, a series of dies carried thereby and movable independently thereof, each die representing a certain fixed sum, a die representing the words "Not over" adapted for use with any one of the other dies, means for actuating one of said first-named dies and said die representing the words "Not over" simultaneously, means for inking said dies prior to their engagement with the paper and means for gripping the paper during the marking or perforating operation.

11. The combination, with a frame and casing, of a die-holder rotating in a vertical plane therein, means for rotating said holder, a series of yieldingly-held dies carried by said holder, a die representing the words "Not over," a plunger adapted to simultaneously move one of said first-named dies and said die representing the words "Not over" simultaneously into engagement with the paper to be marked or perforated, means for operating said plunger, and means for inking said dies.

12. The combination, with a suitable frame and casing, of a die-holder rotating in a vertical plane therein, an indicator-arm for operating said die-holder, a dial over which said arm moves, said dial bearing a series of figures representing certain sums, a series of dies carried by said holder, each die corresponding to a certain sum on the dial and movable independently of said holder, a plunger mechanism provided within the circumference of said holder for actuating any one of said dies to move the same into contact with and force it through the paper to be marked or perforated, and means for inking a die after its adjustment opposite the paper to be marked but before its engagement therewith.

13. The combination, with a suitable frame and casing, of a die-holder rotating in a vertical plane therein, a dial provided on said casing, an arm for rotating said holder and movable over said dial, said dial being provided with a series of figures representing certain sums, a series of dies carried by said holder and movable independently of the same, each die corresponding to a certain sum on the dial, a die representing the words "Not over," means for actuating one of said first-named dies and said last-named die simultaneously to move the same into engagement with the paper to be marked or perforated, and means for inking said dies.

14. The combination, with a rotating die-holder, of a series of dies carried thereby and movable independently thereof, each die representing a certain sum, a die representing the words "Not over" and adapted for use with any one of said first-named dies, a yieldingly-held plunger adapted to move said dies into engagement with the paper to be marked or perforated, a rock-shaft, arms mounted thereon and supporting said plunger, and an operating-lever provided on said shaft for rocking the same and depressing said plunger.

15. The combination, with a frame and casing, of a rotating die-holder, a series of dies carried thereby and movable independently thereof, means for actuating said dies to move them into contact with the paper to be perforated, means for inking said dies during their movement toward and prior to their engagement with the paper, and means for inking them after their passage through the paper, substantially as described.

16. The combination, with a frame and casing, of a die-holder rotating in a vertical plane therein, means for operating said die-holder, a series of dies carried thereby and movable independently thereof, means for actuating said dies to engage and mark or perforate the paper, means for automatically inking said dies during their stroke toward and prior to their engagement with the paper, and means for inking said dies after their passage through the paper.

17. The combination, with a frame, of a rotating die-holder therein and means for operating the same, a dial, a series of dies carried by said holder, each die representing a sum corresponding to a certain sum on the dial, loose pins whereon said dies are supported, springs normally holding said pins in a retracted position, a plunger adapted to engage said pins, a die representing the words "Not over" carried by said plunger, means for operating said plunger to actuate said dies, and means for inking said dies.

18. The combination, with a rotating die-holder, of a series of yieldingly-held dies carried thereby, a rock-shaft, an operating-lever therefor, a plunger, suitable means connecting said rock-shaft and said plunger, an oscillating inking-arm, a brush carried thereby for inking said dies, and suitable connections provided between said oscillating arm and said shaft whereby the rocking of said shaft will operate said arm.

19. The combination, with a die-holder, of the dies thereon movable independently thereof, a die representing the words "Not over," a yieldingly-held plunger, a rock-shaft, an operating-lever therefor, an oscillating inking-brush, and suitable connections provided between said rock-shaft, said plunger and said inking-brush whereby the rocking of said shaft will simultaneously operate said plunger to actuate said dies and oscillate said brush to ink the faces of the dies, substantially as described.

20. The combination, with a rotating die-holder having a series of notches in its edge, of a series of dies carried by said holder and movable independently thereof, means for actuating said dies to engage the paper to be perforated, an oscillating inking-arm, a brush carried thereby, a lever 72 connected with said actuating means and with said oscillating arm to operate said lever, and a lug 76 provided on said lever and adapted to enter one of said notches when said actuating means is operated, for the purpose specified.

21. The combination, with a rotating die-holder and a series of dies carried thereby, of means supporting the paper to be marked, an operative mechanism for causing contact between the paper and dies, and means actuated by the operation of said mechanism for inking a die after it has been adjusted opposite the paper and before its engagement therewith, substantially as described.

22. The combination, with a rotating die-holder, and a series of dies carried thereby, of means supporting the paper to be marked, an operative mechanism for causing contact between the paper and dies, means actuated by the operation of said mechanism for inking said dies immediately prior to their engagement with the paper, and means for inking the under side of the characters marked in or on the paper, substantially as described and for the purpose specified.

23. The combination, of a die-holder consisting of a rotating drum or ring 19, having rows of holes 32 and 33, pins loosely fitting within said holes 33, springs provided on said pins, dies mounted on the ends of said pins and resting on the outer surface of said ring, each die representing a certain fixed sum, a die representing the words "Not over" adapted to be projected through any one of said holes 32, and means for simultaneously projecting said dies, substantially as described.

24. The combination, with a suitable casing, of a rotating die-holder mounted therein, a series of dies carried thereby, a plate adjustably secured on said casing, brackets provided on said plate, and an inking-roller yieldingly supported in said brackets and adapted to engage the points of said dies, substantially as described.

25. The combination, with the die-holder, of a series of movable dies thereon, a plunger for actuating said dies, a die 46 carried by said plunger, a spring normally holding said plunger in a raised position, means for operating said plunger to actuate said dies, and means for inking said dies.

26. The combination, with a die-holder rotating in a vertical plane, of a series of dies carried thereby, means for actuating said dies to mark or perforate the paper, means for inking said dies during their stroke toward and before their engagement with the paper and after their passage through the same.

27. The combination, with a base having a slotted top, of a trough provided beneath said base, a pad arranged in said trough, means for moving said pad back and forth beneath the slot in said base, and a suitable indicator and dial provided in connection with said moving means, whereby the operator can determine the position of said pad with respect to said slot.

28. The combination, with a die-holder rotating in a vertical plane, of a series of dies carried thereby and adapted to perforate cut or crush the paper fiber, an operative mechanism, and means actuated by the force that causes contact between a die and the paper for inking a die after it has been set opposite the paper and said mechanism has been set in motion to perform the perforating, cutting or crushing operation.

29. The combination, with a die-holder rotating in a vertical plane, of a series of dies carried thereby and adapted to perforate, cut or crush the paper fiber, an operating mechanism, means for inking a die after said mechanism has been actuated to perform the perforating, cutting or crushing operation and before the engagement of said die with the paper, and means for inking the under side of the characters formed in or on the paper by said die, substantially as described and for the purpose specified.

30. The combination, with a ring or drum adapted to rotate in a vertical plane, of a series of dies provided on the periphery of said drum and adapted to perforate, cut or crush the paper fiber, a mechanism which when operated causes contact between a die and the paper, and means actuated by said mechanism for inking said die after it has been adjusted opposite the paper and said mechanism has been set in motion and before the die engages the paper.

31. The combination, with a rotating ring or drum, of a series of dies carried thereby and adapted to be moved radially with respect thereto, a plunger provided within said drum for actuating said dies, means for operating said plunger and means for inking said dies during their radial movement toward the paper and before their engagement therewith.

32. The combination, with a ring or drum rotating in a vertical plane, of a series of dies provided on the periphery of said drum, yieldingly-held pins whereon said dies are mounted, said pins having a radial movement with respect to said drum, a plunger provided within said drum for actuating said pins and dies, means for operating said plunger, means for inking said dies during their radial movement toward the paper and before their engagement therewith, and means for inking the under side of the characters formed in or on the paper by said dies.

33. The combination, with the top 7 having a slot 64 and groove 65, of a die adapted to register with said slot, and means for pressing the paper into said groove and drawing it taut across said slot during the perforating or marking movement of said die, substantially as described.

34. The combination, with a base, of a casing thereon, a standard whereon said casing is supported, perforating and inking devices provided within said casing and said base, an opening or slot 60 provided between said base and casing, and said standard and said casing permitting the insertion or withdrawal of a check at the front, back or sides of the machine, for the purpose specified.

35. The combination, with a base 2 having openings in its walls, of an ink-pad trough provided within said base and having open ends opposite said openings, a slidable pad provided within said trough, and removable plates 89 provided on said base over the openings therein, substantially as described.

36. In a check-protector, the combination, with a rotating die-holder, of a series of movable dies carried thereby, means for actuating said dies to move them into engagement with the paper to be perforated or marked, an inking device arranged to ink a die without moving said holder, and operative connections provided between said inking device and said actuating means arranged to actuate the former by the same force that moves a die toward the paper, substantially as described and for the purpose specified.

In witness whereof I have hereunto set my hand this 1st day of February, 1901.

GAYLORD W. BEEBE.

In presence of—
RICHARD PAUL,
M. C. NOONAN.